Figure 1:
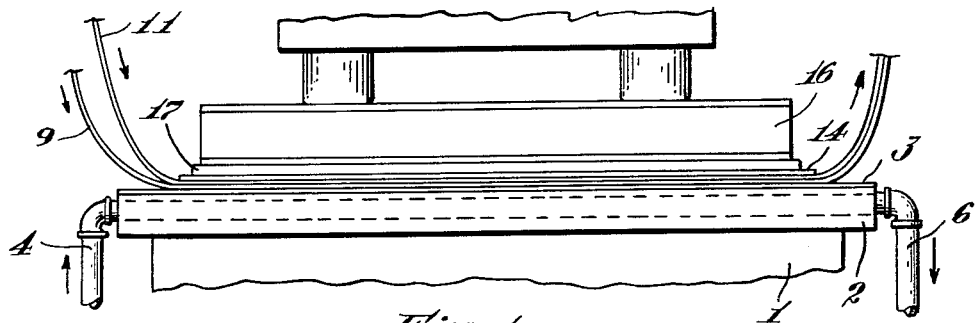

May 22, 1962  H. PEASGOOD  3,035,749
TOOTHED CONVEYOR FOR CINEMATOGRAPHIC FILM AND THE LIKE
Filed March 27, 1956

Inventor
Harold Peasgood
by Roberts, Cushman & Grover
Attys ced rela-
United States Patent Office 3,035,749
Patented May 22, 1962

3,035,749
TOOTHED CONVEYOR FOR CINEMATOGRAPHIC FILM AND THE LIKE
Harold Peasgood, Slough, England, assignor to Technicolor Corporation, Hollywood, Calif., a corporation of Maine
Filed Mar. 27, 1956, Ser. No. 574,293
6 Claims. (Cl. 226—74)

This invention relates to conveyor belts having teeth fitting the perforations of motion picture film for holding two films in register with each other while they travel together along a predetermined path in a cinematographic machine such as an imbibition machine or a contact printer.

Heretofore it has been proposed to make such belts by perforating a ribbon of stainless steel like a motion picture film, inserting headed register pins or teeth in the perforations from the back of the ribbon with the heads of the pins seating against the back, and then soldering the heads to the back of the ribbon. However this construction has not been satisfactory for various reasons, chiefly because the belts are thicker in the region of the pin heads. The variation in thickness results in breakage of the belt at the junctions between the thin and thick portions as the belt flexes back and forth over its guide rollers. This variation also interferes with the use of the belt, particularly where films must be pressed against the belt with uniform pressure throughout the area of the belt.

It has also been proposed to make a register belt by perforating a ribbon with holes somewhat smaller than those of the film and using pins which have shanks fitting the holes with shoulders seating on the front of the belt around the bases of the shanks, the pins being inserted from the front instead of the back and the tips of the shanks being swaged or spun to form rivet heads which anchor the pins in the belt. Not only is this construction costly but here again it is difficult to obtain uniform pressure on the films throughout the area of the belt because the pin heads project slightly beyond the rear surface of the belt.

Objects of the present invention are to overcome the aforesaid difficulties and to provide a film conveyor which is simple and economical in construction, which is durable and reliable in use, and which affords uniform pressure on films pressed against it throughout its entire area.

According to this invention the heads of the pins or teeth are covered with a flexible sheet of material adhering to the back of the ribbon. Preferably the sheet comprises plastic covering the entire back of the ribbon and the heads of the pins are embedded in the plastic layer so that the distance from the outside surface of the layer to the ribbon is substantially uniform throughout the area of the layer. The plastic material is preferably rubber or rubber-like material and the sheet is preferably attached to the ribbon with thermo-setting cement or other flexible cement. The cement may be applied either to the ribbon or to the sheet but preferably it is applied to both by spraying. When the teeth are inserted from the back of the ribbon with pre-formed heads seating against the back, the layer of plastic material may also serve to hold the teeth in place, thereby eliminating the use of solder with its attendant disadvantages.

Figure 2:
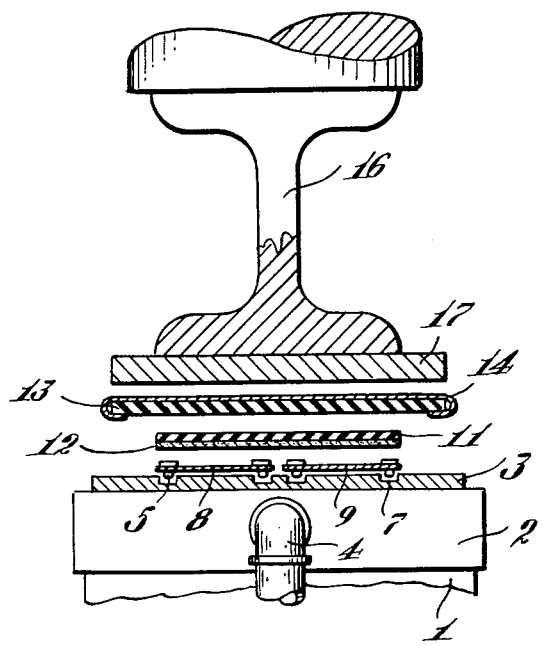
Figure 3:
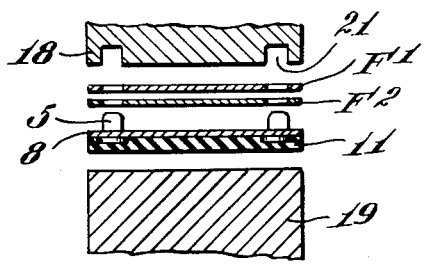

For the purpose of illustration a typical embodiment of the invention is shown in the accompanying drawings in which FIG. 1 is a side elevation of a machine for making a register belt of the type referred to;

FIG. 2 is an end elevation with parts in section and in spaced relationship; and FIG. 3 is a section of the finished belt in spaced relationship to films and rolls such as employed in using the belt.

The particular embodiment of the invention chosen for the purpose of illustration comprises a base 1 carrying a bed which comprises a steam chamber 2 and a cover plate 3, the chamber 2 having a steam inlet 4 and an outlet 6. The plate 3, which is preferably formed of brass, is provided with recesses 7 to receive the tips of register pins 5. In the illustration two ribbons 8 and 9 are positioned side by side and covered with a single rubber backing 11 coated on its face with adhesive 12. After the rubber strip is attached to the two ribbons 8 and 9 it is split down the middle to separate the two ribbons. Over the rubber strip is applied a rubber blanket 13 provided with an aluminum shroud 14 to restrain transverse expansion under pressure. The parts are pressed together in any suitable manner, as for example by an hydraulically operated head comprising an I-beam 16 and a pressure plate 17.

In use the pins 5 are placed in perforations in the margins of the ribbon 8 and 9 and the ribbons are laid on the bed plate with the tips of the pins extending into the recesses 7. The rubber backing is then placed over the belts, the blanket 13 applied over the backing and the parts are pressed together against the heated bed until the thermo-setting adhesive is cured, after which the steam is replaced with cooling water to reduce the temperature to normal.

The rubber backing may be only a few hundredths inch in thickness, for example three hundredths, but it should be thick enough to make the combined thickness of rubber and metal approximately uniform throughout the area of the belt. The rubber should be uncontaminated by French chalk or any greasy substance, and before the adhesive is applied the rubber strip should be immersed in concentrated sulphuric acid for a short time, preferably one to two minutes, then washed thoroughly with clean water. This treatment produces fine hair cracks in the surface of the rubber strip which afford good adhesion. The preferred adhesive is a thermo-setting phenol-formaldehyde, e.g. REDUX 120 made by Aero Research Limited, Duxford, Cambridge, England. After the adhesive is applied to the treated surface of the rubber strip it is allowed to dry. In liquid form the adhesive is milky but when dry the milkiness has disappeared, leaving the surface non-tacky but not brittle. Before the rubber strip is joined to the metal ribbon, the metal should be slightly roughened with emery paper to obtain good adhesion. Both the register pins and the metal ribbons should be free from the slightest trace of grease or oil, and to achieve this condition the parts are preferably washed in carbon tetrachloride and thereafter carefully handled to prevent the slightest contamination. Preferably the curing operations start at room temperature and the parts are raised slowly to a temperature of about 280–300° F. as quickly as possible and held at that temperature for about 20 minutes.

A typical use of the register belt consists in applying the two films F1 and F2 to the belt in superposition and then pressing them into intimate contact with each other, as for example in making an imbibition print on a blank film from a dye-soaked printing matrix. For this purpose the films are fed to the belt continuously, then pressed together by rollers 18 and 19 and then permitted to travel together for a time sufficient for dye transfer in well known manner. As shown in FIG. 3 one of the pressure rolls 18 has recesses 21 to receive the tips of the register pins.

According to this invention the register belt is simple and economical in construction, durable and reliable in use and when films are pressed against it, affords uniform pressure throughout its entire area.

It should be understood that the present disclosure is for the purpose of illustration only and that this invention includes all modifications and equivalents which fall within the scope of the appended claims.

I claim:

1. A conveyor for motion picture film comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon, and a layer of rubber-like material adhering to the back of the ribbon and covering said heads, said heads being embedded in said layer so that the distance from the outside surface of the layer to the ribbon is substantially uniform throughout the area of the layer.

2. A conveyor for motion picture film comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon, and a sheet of flexible plastic material covering said heads, the sheet being secured to the back of the ribbon with flexible cement on each side of each of said rows, and said heads being embedded in said sheet so that the distance from the outside surface of the layer to the ribbon is substantially uniform throughout the area of the layer.

3. A conveyor for motion picture film comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon and a sheet of flexible plastic material covering said heads, the sheet being secured to the back of the ribbon with thermo-setting cement on each side of each of said rows, and said heads being embedded in said sheet so that the distance from the outside surface of the layer to the ribbon is substantially uniform throughout the area of the layer.

4. Cinematographic apparatus for feeding superposed perforated motion picture films comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon, and a layer of rubber-like material adhering to the back of the ribbon and covering said heads, said heads being embedded in said layer so that the distance from the outside surface of the layer to the ribbon is substantially uniform throughout the width of the ribbon, a backing roll having a continuously smooth cylindrical surface bearing against said layer and being at least as wide as said ribbon, a confronting pressure roll located adjacent the opposite or pin side of the ribbon and also being at least as wide as the ribbon, the pressure roll having a smooth cylindrical surface which has recesses to accommodate the projecting portion of the pins, whereby two or more superimposed films trained between said rolls with the projecting ends of the teeth fitting into the sprocket holes of the films are pressed together with substantially uniform pressure throughout the entire width of the films.

5. Cinematographic apparatus for feeding superposed perforated motion picture films comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon, and a sheet of flexible plastic material covering said heads, the sheet being secured to the back of the ribbon with flexible cement on each side of each of said rows, and said heads being embedded in said sheet so that the distance from the outside surface of the layer to the ribbon is substantially uniform throughout the width of the ribbon, a backing roll having a continuously smooth cylindrical surface bearing against said layer and being at least as wide as said ribbon, a confronting pressure roll located adjacent the opposite or pin side of the ribbon and also being at least as wide as the ribbon, the pressure roll having a smooth cylindrical surface which has recesses to accommodate the projecting portion of the pins, whereby two of more superimposed films trained between said rolls with the projecting ends of the teeth fitting into the sprocket holes of the films are pressed together with substantially uniform pressure throughout the entire width of the films.

6. Cinematographic apparatus for feeding superposed perforated motion picture films comprising a ribbon of flexible rust-proof material having one or more rows of perforations corresponding to those of motion picture film, register teeth fitted in the perforations from the back of the ribbon, the front ends of the teeth projecting from the front of the ribbon and being shaped to engage in the sprocket holes of motion picture film, the rear ends of the teeth having heads seating on the back of the ribbon, and a sheet of flexible plastic material covering said heads, the sheet being secured to the back of the ribbon with thermo-setting cement on each side of each of said rows, and said heads being embedded in said sheet so that the distance from the outside surface of the layer to the ribbon is substantially uniform throughout the width of the ribbon, a backing roll having a continuously smooth cylindrical surface bearing against said layer and being at least as wide as said ribbon, a confronting pressure roll located adjacent the opposite or pin side of the ribbon and also being at least as wide as the ribbon, the pressure roll having a smooth cylindrical surface which has recesses to accommodate the projecting portion of the pins, whereby two or more superimposed films trained between said rolls with the projecting ends of the teeth fitting into the sprocket holes of the films are pressed together with substantially uniform pressure throughout the entire width of the films.

References Cited in the file of this patent

UNITED STATES PATENTS

| | | |
|---|---|---|
| 339,394 | Fallows | Apr. 6, 1886 |
| 846,534 | Voorhees | Mar. 12, 1907 |
| 1,107,372 | Smith | Aug. 18, 1914 |
| 1,986,925 | Finn | Jan. 8, 1935 |
| 2,144,495 | Humphrey | Jan. 17, 1939 |